United States Patent [19]

Amersfoort

[11] Patent Number: 4,536,920

[45] Date of Patent: Aug. 27, 1985

[54] TWO STAGE MEAT STRAINER

[75] Inventor: Andre G. Amersfoort, Montfoort, Netherlands

[73] Assignee: Boldt Industries, Inc., Des Moines, Iowa

[21] Appl. No.: 540,653

[22] Filed: Oct. 11, 1983

[51] Int. Cl.$^3$ ............................................. A22C 17/00
[52] U.S. Cl. ........................................ 17/46; 17/1 G; 241/24; 241/76; 241/82.3
[58] Field of Search ..................... 17/1 G, 46; 241/24, 241/74, 76, 82.3, 82.1, 82.2, 152 R, 163, 89.2

[56] References Cited

U.S. PATENT DOCUMENTS

| | | | |
|---|---|---|---|
| 1,780,067 | 10/1930 | Cox | 241/82.3 |
| 3,396,768 | 8/1968 | Kurihara | 17/1 G X |
| 3,739,994 | 6/1973 | McFarland | 241/74 |
| 3,841,197 | 7/1958 | Ardrey | 241/82.4 |
| 4,025,001 | 5/1977 | Yarem | 241/74 |
| 4,069,980 | 1/1978 | Yarem | 241/74 |

FOREIGN PATENT DOCUMENTS

| | | | |
|---|---|---|---|
| 1032902 | 6/1958 | Fed. Rep. of Germany | 241/82.3 |
| 2901909 | 7/1980 | Fed. Rep. of Germany | 17/46 |

*Primary Examiner*—Willie G. Abercrombie
*Attorney, Agent, or Firm*—Zarley, McKee, Thomte, Voorhees & Sease

[57] ABSTRACT

A two-stage meat straining apparatus is provided in which a pair of communicating presses separate meat from bone. Each press has a cylindrical pressure chamber for containing meat and bones to be separated, a sealing wall for closing off one end of the pressure chamber, and an exchangeable cylindrical lining sleeve within the pressure chamber having openings extending therethrough and debouching into collector channels in the pressure chamber, through which openings meat is forced to separate meat from bones when suitable pressure is exerted on the meat and bone combination. Pressure is exerted on the contents of the pressure chamber of the first stage of the apparatus by a hydraulically activated pressure piston slidably mounted within the pressure chamber. Meat filtered through the lining sleeve of the first pressure chamber is advanced to the second pressure chamber in the second stage of the apparatus wherein it is forced through a second lining sleeve by an auger mounted rotatably within the second pressure chamber. The openings in the second lining sleeve are smaller in diameter than those in the first lining sleeve, so that meat is further separated from any bone passing through the first lining sleeve.

12 Claims, 3 Drawing Figures

TWO STAGE MEAT STRAINER

BACKGROUND OF THE INVENTION

The mechanical separation of various meat and bone combinations to produce a high quality meat product is a well established industry. Apparatus for such separation processes are common. These apparatus generally are one stage strainers in which a combination of meat and bone is forced through a perforated screen so as to separate the meat from the bone. However, it is common for some bone material to also pass through the screen and be included in the recovered meat product. The bone calcium content in the recovered product often exceeds government and industry standards.

Therefore, it is a primary objective of the present invention to provide a process and an apparatus for the mechanical separation of meat from bone to a degree at least sufficient to meet government and industry standards.

A further objective of the present invention is the provision of a process and apparatus for an efficient and economical mechanical separation of meat from bone.

A further objective of the present invention is the provision of a process and apparatus that will remove in excess of 98% of bone from a meat and bone combination.

A further objective of the present invention is a process and apparatus for the mechanical separation of meat from bone without significantly increasing the temperature of the meat.

A further objective of the present invention is the provision of a second meat strainer that can be used in combination with a conventional one stage meat strainer to further separate meat from bone.

SUMMARY OF THE INVENTION

The apparatus for the mechanical separation of meat from bone includes a two-stage meat strainer. The first press stage comprises a pressure piston slidably mounted within a pressure chamber which contains the meat and bone materials to be separated. A perforated lining sleeve within the chamber permits meat and some bone to be forced through the sleeve when the pressure piston is activated to compress the material. The meat and bone product which is forced through the sleeve openings passes through a conduit to the second stage of the apparatus.

The second press stage of the apparatus comprises a pressure chamber for containing the meat and bone products from the first stage which is to be further separated. An auger rotatably mounted within the pressure chamber advances the meat and bone combination from the first stage into the pressure chamber of the second stage. As additional material is introduced into the pressure chamber by the auger, the material is forced through the holes in a perforated lining sleeve within the chamber. The meat product forced through the lining sleeve of the pressure chamber of the second stage is nearly calcium free.

The pressure chambers of each stage are easily accessible for removing the remaining bone deposits from the chamber and for cleaning the lining sleeves. The lining sleeves of each stage may be replaced by other lining sleeves with differing diameter perforations depending on the type of meat to be strained.

The method of using the above described apparatus involves introducing the meat and bone material to be separated into the pressure chamber of the first press and then exerting a pressure on the material by activation of the pressure piston onto the contents of the pressure chamber such that meat and some bone is forced through the openings of the lining sleeve and into the conduit between the first and second stages. The auger then advances the meat and bone material pressed through the first stage into the pressure chamber of the second press where it is forced through the openings of the lining sleeve in the second stage to produce a nearly pure meat product. Each filtering stage of the process is operated intermittently such that the material is first compressed in the first stage and upon completion of the first stage operation, the second stage straining is commenced. While the second stage operation is proceeding, new meat and bone material to be separated may be introduced into the first stage so that the process may be repeated.

DETAILED DESCRIPTION OF THE DRAWINGS

Figure 1:
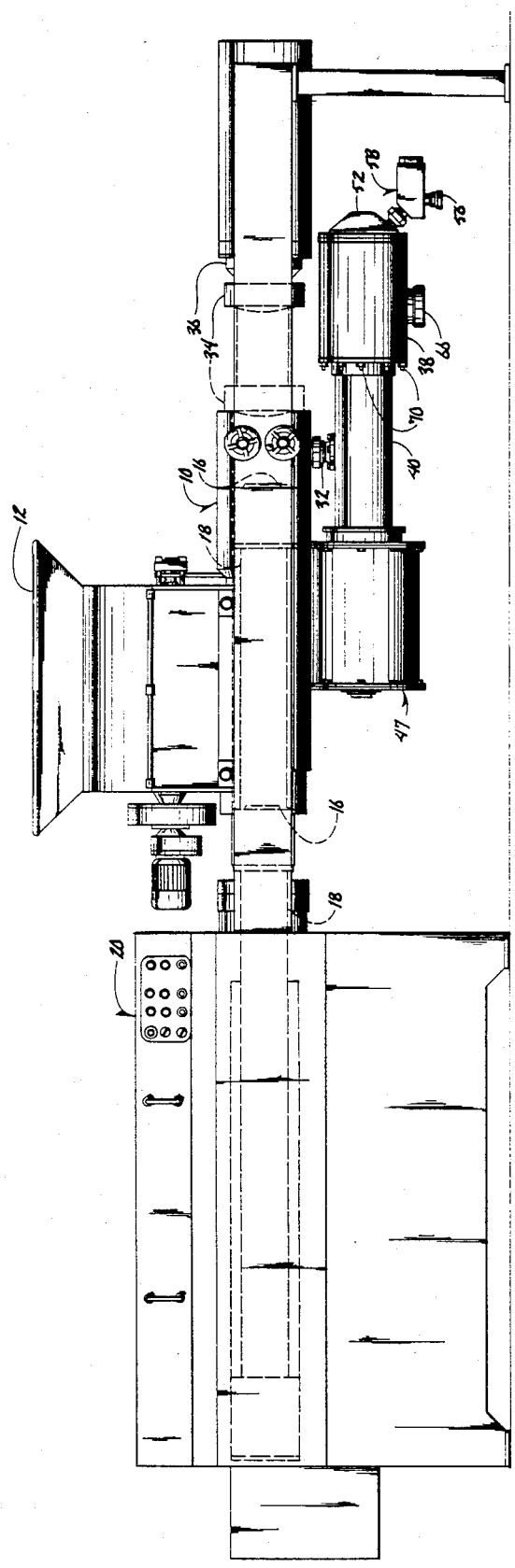
FIG. 1 is a side elevation view showing the apparatus combination of the present invention.
Figure 3:
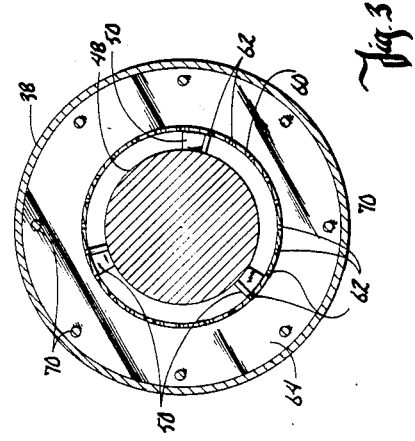
FIG. 3 is a view taken along line 3—3 of FIG. 2.
Figure 2:
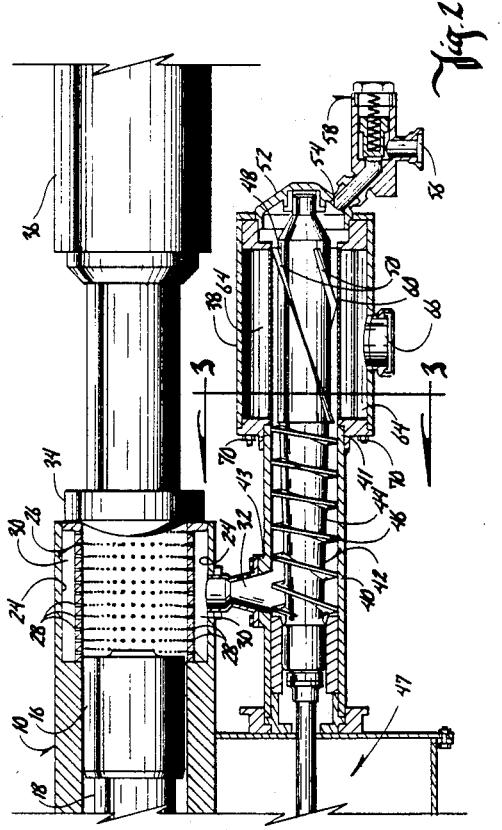
FIG. 2 is a sectional side elevation view showing a portion of the two stage straining apparatus of the present invention.

The apparatus of the present invention generally comprises two stages for straining meat from a meat and bone combination. The first stage of the apparatus is covered and protected by the applicant's United Kingdom Pat. No. 1,563,750, published Mar. 26, 1980. The first stage press of the apparatus consists of a pressure chamber 10 with a filler opening 12 through which bones with meat adhering thereto, i.e. the basic material, can be introduced into the pressure chamber. Filler opening 12 can be closed by a cover (not shown). Pressure chamber 10 is open at both ends and a pressure piston 16 projects through one end of the chamber. Pressure piston 16 is mounted on a piston rod 18 and can be moved, for instance by hydraulic pressing means 20, through pressure chamber 10 up to at least the other end of the chamber.

Pressure chamber 10 is provided with a bore 24 having inserted therein a cylindrical lining sleeve 26 which is provided with radial outlet openings 28 in its cylindrical wall. The outer surface of lining sleeve 26 closely fits on the inner cylindrical surface of pressure chamber 10. Outlet openings 28 debouch into a collector channel 30 surrounding lining sleeve 26 and in the surface of bore 24 in pressure chamber 10, collector channel 30 communicating with an outlet conduit 32.

The end of pressure chamber 10 with lining sleeve 26 is sealable by a sealing wall 34 which is moveable away from the lining sleeve by a distance at least equal to the length of lining sleeve 26 by means of, for instance, hydraulic pressing means 36.

The second stage of the apparatus is the novel aspect of the present invention and includes a pressure chamber 38 whose longitudinal axis is aligned with that of an elongated cylindrical conduit 40. One end 41 of conduit 40 is in communication with pressure chamber 38, while the opposite end 43 is in communication with outlet conduit 32 thus providing a passageway from collector channel 30 of pressure chamber 10 to pressure chamber 38.

Rotatably mounted within conduit 40 is an auger 42 having a shaft 44 and a spiralling blade 46. Any conventional drive means 47 may be used to drive auger 42. Shaft 44 is securely attached near end 41 of conduit 40 to a second shaft 48 which is rotatably mounted within pressure chamber 38. Shaft 48 has a spiralling blade 50 whose pitch is greater than that of blade 46.

A removeable sealing wall 52 serves to close pressure chamber 38 opposite the end in communication with conduit 40. An opening 54 in sealing wall 52 provides communication to an exit conduit 56 for the removal of bone material. A check valve 58 closes conduit 56 so that bone material may be removed at selected times.

A perforated lining sleeve 60 is removeably mounted within pressure chamber 38. Liner sleeve 60 has openings 62 which permit meat to be forced through the sleeve by blades 50 and into a collector channel 64 surrounding sleeve 60. A meat outlet conduit 66 permits strained meat to be collected from collector channel 64.

Lining sleeves 26 and 60 are each exchangable with similar sleeves so that a used lining sleeve can be replaced by a clean lining sleeve, so that the press is quickly ready to be used again and so that the replaced lining sleeve and particularly its outlet openings 28 and 62, respectively, can easily be cleaned outside their respective pressure chambers.

Also, lining sleeves 26 and 60 can be exchanged with sleeves having different diameter of openings, depending on the type of meat to be filtered therethrough. The diameter of opening 62 are always less than the diameter of openings 28 to provide for the further separation of meat from bone. The diameter of the openings has to be small enough to stop small pieces of bone from passing therethrough and at the same time, be large enough to permit meat to pass therethrough.

The process for using the above described apparatus is as follows. The meat and bone combination to be separated is introduced into pressure chamber 10 via filler opening 12. Sealing wall 34 is closed by hydraulic means 36 and pressure piston 16 is activated by hydraulic pressing means 20. As pressure piston 16 compresses the meat and bone material, meat and some bone is forced through the outlet openings 28 of lining sleeve 26 and into collector channel 30. As collector channel 30 fills, the material passes through outlet conduit 32 and into conduit 40 of the second stage of the apparatus. Pressure piston 16 is activated for approximately 12 seconds at low horsepower so as to keep the temperature rise of the meat and bone product to a minimum. After pressure piston 16 has completed its compressing cycle, it is retracted from pressure chamber 10 so that additional meat and bone material may be introduced therein. Bone material from the first stage may be removed by opening sealing wall 34.

Upon completion of the compression cycle of piston 16, auger 42 is activated by auger drive means 47 so that the meat and bone material filtered through the first press stage is advanced into pressure chamber 38 of the second press stage. The contents of pressure chamber 38 are compressed as additional material is introduced therein so that meat is further separated from bone and forced through openings 62 of lining sleeve 60 and into collector channel 64 of pressure chamber 38. The deboned meat product from the second stage then can be removed via conduit 66 while the bone matter may be collected from conduit 56 by opening check valve 58.

This second filter stage is operated for approximately 10 seconds with essentially no temperature rise being produced in the contents of pressure chamber 38.

When necessary, sealing walls 34 and 52 can be removed from pressure chambers 10 and 38, respectively, so that the chambers may be cleaned and so that the lining sleeves 26 and 60, respectively, can be removed for changing and cleaning.

The first stage of the apparatus of the present invention removes approximately 98% of the bone from the meat and bone combination. The second stage then further separates the meat from the bone so that a nearly calciumm-free meat product is produced, thus satisfying both government and industry standards.

What is claimed is:

1. A method for separating and removing meat from bones by utilizing a pair of first and second communicating presses, each press having a cylindrical pressure chamber for containing meat and bones to be separated, a sealing wall for closing off one end of the pressure chamber, a cylindrical lining sleeve within the pressure chamber having openings extending therethrough, the openings in the sleeve of the second press being smaller in diameter than the openings of the sleeve in the first press and a collector channel in the pressure chamber surrounding said lining sleeve, said method comprising:

introducing a combination of meat and bones to be separated into said pressure chamber of said first press, exerting a pressure on the contents of said pressure chamber of said first press whereby said combination is partially separated by forcing meat and some bone outwardly through the openings of said sleeve of said first press into said collector channel of said first press, advancing the partially separated combination of meat and bones in said collector channel of said first press into said pressure chamber of said second press, compressing the partially separated combination of meat and bones within said pressure chamber of said second press whereby meat is forced outwardly through the openings of said sleeve of said second press into said collector channel of said second press so as to further separate the meat from the bone.

2. The method of claim 1 wherein said presses are provided with a plurality of mutually exchangeable cylindrical lining sleeves with the openings in each sleeve differing in diameter from the openings in the other sleeves, and the type of meat being separated from bone dictating the sleeves to be used in said presses.

3. The method of claim 1 whereby pressure is exerted on the contents of said pressure chamber of said first press by a pressure piston slidably mounted within said chamber.

4. The method of claim 1 wherein material is advanced from the collector channel of the first press to the pressure chamber of the second press by an auger rotatably mounted within the chamber.

5. The method of claim 1 wherein contents of said pressure chamber of said second press are compressed by an auger rotatably mounted in said chamber which introduces additional meat and bone material into the pressure chamber.

6. The method of claim 1 wherein said first and second presses are activated intermittantly.

7. In combination, a first press for separating meat from bones including a cylindrical pressure chamber for containing a combination of meat and bones to be separated, a lining sleeve within the pressure chamber having openings therein, a collector channel surrounding said lining sleeve, and a pressure means within said pressure chamber and operatively extending into said lining sleeve for exerting pressure on the meat and bones within said pressure chamber to partially separate the meat and bone combination by forcing meat and some bone outwardly through said openings in said lining sleeve into the surrounding collector channel, and a second press for further separating meat from bones, said second press comprising:

- a cylindrical wall defining a cylindrical pressure chamber for containing meat and bones to be further separated and being in communication with said collector channel of the first press,
- a sealing wall attached at one end of the pressure chamber of the second press opposite the auger for closing off the end of the pressure chamber of the second press opposite said auger when meat and bones are to be separated in said pressure chamber,
- a cylindrical lining sleeve within the pressure chamber of the second press having openings extending therethrough, said openings in said sleeve of said second press being smaller in diameter than said openings in said sleeve of said first press,
- a collector channel surrounding said lining sleeve of the second press; and
- an auger rotatably mounted within the pressure chamber of the second press for advancing the partially separated combination of meat and bones from the collector channel of the first press into the pressure chamber of the second press and for further separating the combination of meat and bones by forcing meat outwardly through said openings of said lining sleeve of the second press into the surrounding collector channel of the second press.

8. The combination of claim 7 wherein said second press further comprises a second cylindrical wall defining a conduit through which said auger extends, one end of said conduit being in communication with said collector channel of said first press and the opposite end being in communication with said pressure chamber of said second press.

9. The combination of claim 8 wherein the longitudinal axis of said conduit of said second press is aligned with the longitudinal axis of said pressure chamber of said second press.

10. The combination of claim 8 wherein said auger comprises an elongated shaft extending through said conduit and said pressure chamber of said second press and having a spiralling blade attached thereto, the pitch of said blade being greater within said pressure chamber of said second press than within said conduit of said second press.

11. The combination of claim 7 wherein said sealing wall includes a check valve for closing off the end of said pressure chamber opposite said auger when meat and bones are to be separated in said pressure chamber of said second press.

12. The combination of claim 7 wherein said second press is provided with a plurality of mutually exchangeable cylindrical lining sleeves, the openings in each sleeve differing in diameter from the openings in the other sleeves.

* * * * *